J. H. CRESWELL, Jr.
TURNER ATTACHMENT.
APPLICATION FILED NOV. 27, 1915.
1,190,385.
Patented July 11, 1916.
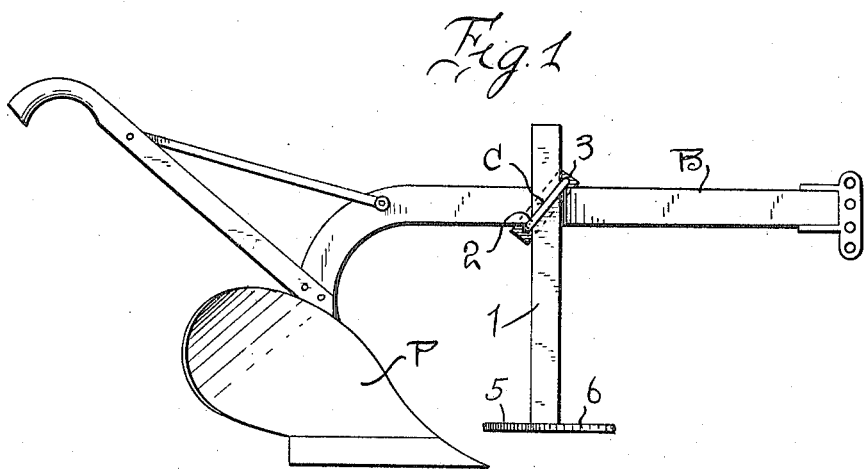
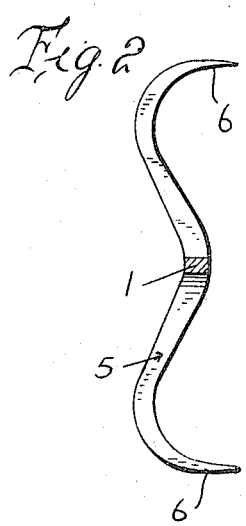
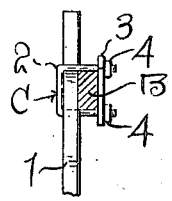
Inventor
J. H. CRESWELL Jr.
By Watson E. Coleman
Attorney

UNITED STATES PATENT OFFICE.

JOHN HOBSON CRESWELL, JR., OF PEROTE, ALABAMA.

TURNER ATTACHMENT.

1,190,385.	Specification of Letters Patent.	Patented July 11, 1916.

Application filed November 27, 1915. Serial No. 63,852.

*To all whom it may concern:*

Be it known that I, JOHN H. CRESWELL, Jr., a citizen of the United States, residing at Perote, in the county of Bullock and State of Alabama, have invented certain new and useful Improvements in Turner Attachments, of which the following is a specification, reference being had to the accompanying drawings.

This invention relates to certain improvements in turner attachments for plows and has relation to a device especially designed and adapted for use in connection with cotton stalks or the like; and it is an object of the invention to provide a novel and improved device of this general character whereby the stalks will be effectively pressed upon the surface of the ground so that the same may be turned into the earth through the medium of a conventional plow.

The invention consists in the details of construction and in the combination and arrangement of the several parts of my improved turner attachment whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in side elevation illustrating a turner constructed in accordance with an embodiment of my invention and in applied position; Fig. 2 is a view, partly in section and partly in top plan of my turner as herein embodied; and Fig. 3 is a detail view, partly in elevation and partly in section, illustrating the manner of attaching my improved turner to the beam of a plow as herein set forth.

As disclosed in the accompanying drawings, B denotes a plow beam of conventional form having operatively engaged therewith a plow P of any ordinary or preferred construction.

1 denotes a standard of predetermined dimensions adapted to overlie a side of the beam B and held to the beam through the medium of the clamp C, herein disclosed as a U-shape member 2 straddling the beam and overlying the upright 1 and having its free extremities disposed through the plate 3 with which contact the burs or nuts 4 threaded upon the free end portions of the member 2.

Secured to the lower extremity of the standard 1 is the member 5 comprising the oppositely directed reëntrant arms 6, the standard 1 being connected to the member 5 at substantially the longitudinal center of the member. This member 5 is adapted to engage adjacent rows of stalks and press the same upon the surface of the ground so that the stalks will be turned under by the plow P. This device is especially desirable for the purpose of destroying boll weevil as it has been found in practice that the insects are buried a sufficient depth so as to prevent their return.

It is to be understood that the standard 1 is positioned in advance of the plow P but in close proximity thereto. It is to be particularly noted that the end faces of the arms 6 of the member 5 are flat and disposed in the same horizontal plane and that the under face of the member 5 is unobstructed throughout its length.

From the foregoing description, it is thought to be obvious that a turner attachment constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A turner attachment for a plow consisting of a standard and a substantially horizontally disposed member secured to the lower end of the standard, said member comprising oppositely directed reëntrant arms, the under face of the member being flat, said under face being disposed in the same horizontal plane throughout its length and being free and unobstructed.

In testimony whereof I hereunto affix my signature in the presence of two witnesses.

JOHN HOBSON CRESWELL, Jr.

Witnesses:
E. P. HASLAM,
HELEN DAVIS.